Patented Sept. 7, 1926.

1,599,121

UNITED STATES PATENT OFFICE.

THOMAS A. EDISON, OF WEST ORANGE, NEW JERSEY, ASSIGNOR TO THOMAS A. EDISON, INCORPORATED, OF WEST ORANGE, NEW JERSEY, A CORPORATION OF NEW JERSEY.

PRODUCTION OF DEPOLARIZING AGENT FOR VOLTAIC BATTERY.

No Drawing. Original application filed January 5, 1921, Serial No. 435,122. Divided and this application filed February 26, 1924. Serial No. 695,156.

My invention relates to the production of material especially designed for use as a depolarizing agent for voltaic batteries and more particularly to the production of such a material comprising or containing cupric hydroxide. While this material is especially adapted to be used in forming the depolarizing electrodes of primary batteries of the type wherein a depolarizing electrode consisting of an element or elements formed of a compound of copper and an electrode connected to the external negative pole and consisting of an element or elements of zinc, are disposed in a caustic alkaline electrolyte, such as a solution of caustic soda or caustic potash, it is to be understood that such material is not limited to this use.

In primary batteries of the type referred to the depolarizing electrode elements are usually formed of black anhydrous cupric oxide, which is either properly molded and agglomerated in the form of plates or cylinders, or is packed in suitable perforated metallic containers. I have discovered that where a material comprising cupric hydroxide rendered stable under ordinary conditions, is used for the depolarizing electrodes in primary batteries of the character described instead of anhydrous cupric oxide, as is customary, the voltage of the current obtained from such batteries will be materially increased.

In my pending application, Serial No. 435,122, filed January 5, 1921, and entitled Voltaic batteries and the production of electrode elements therefor, on which Patent No. 1,489,240 was granted April 8, 1924, I have described and claimed the material comprising or containing cupric hydroxide referred to, as well as battery electrode elements formed of said material, and a battery cell having as one of its elements an electrode formed of such material. The present application is a division of my said pending application and is especially directed to the method of producing said material.

Cupric hydroxide produced as a precipitate or in the presence of water is very unstable and even at ordinary temperature dehydrates to black anhydrous cupric oxide. Crystallized cupric hydroxide has been produced, but in order to do this it has been necessary to employ very low temperatures and to take other precautions. When such crystallized cupric hydroxide is used in a primary battery cell of the type above described, in place of the usual anhydrous cupric oxide, it quickly dehydrates to the anhydrous state and acts very capriciously in every way. I have found, however, that cupric hydroxide has a slight affinity for the hydroxides of the metals of the alkaline earths, namely, hydroxides of calcium, strontium, barium or magnesium, all of which are more or less insoluble in solutions of the stronger alkalies, such as caustic soda and caustic potash, usually employed as the electrolyte of primary battery cells of the type described, and that when cupric hydroxide is properly formed and combined with any of such hydroxides of the metals of the alkaline earths, its stability will be very materially increased. Magnesium hydroxide is more insoluble in electrolytes consisting of solutions of caustic soda or caustic potash than any of the other alkaline hydroxides mentioned, and accordingly is the one which I prefer to combine with the cupric hydroxide to render the latter stable.

The method which I prefer to employ in producing the cupric, magnesium hydroxide combination is as follows:

Copper sulphate and magnesium sulphate are first mixed in solution in proper proportions and the solution then subjected to the action of a caustic alkali, preferably caustic soda. This results in the formation of cupric hydroxide in the presence of magnesium hydroxide, these hydroxides being simultaneously precipitated. The precipitated cupric hydroxide combines with the precipitated magnesium hydroxide producing a salt sufficiently stable to prevent dehydration under ordinary conditions. The cupric hydroxide in this combination will not be decomposed or dehydrated to cupric oxid even at 140° Fahrenheit and in the presence of a strong alkali, and it is therefore practicable to form the depolarizing electrode elements of primary batteries of the type described, of this cupric and magnesium hydroxide combination. The proportions of cupric hydroxide and magnesium hydroxide in the combination described, which I find most favorable to stabilize the cupric hydroxide, are approximately 10 parts by weight of dry cupric hydroxide to approximately 4 parts by weight of dry magnesium hydroxide, and in producing this combination as above described 25.6 parts by weight of crystallized copper sulphate and 16.9 parts by weight of crystallized magnesium sulphate are preferably mixed in solution so that the precipitate obtained upon treating the solution with the caustic soda will contain such hydroxides in these proportions. While a greater proportion of magnesium hydroxide may be used in the combination, no advantage results therefrom as the stability of the cupric hydroxide will be no greater. The solution of copper sulphate and magnesium sulphate is precipitated by adding thereto at ordinary room temperature a solution of the caustic soda of any degree of concentration, the amount of caustic soda employed being at least sufficient to wholly precipitate the mixed solution. The precipitate is washed to free it from the products of the reaction, including any excess caustic soda, in the usual manner.

Where depolarizing electrode elements are to be formed from the precipitate, produced as described above, and consisting of the combined cupric and magnesium hydroxides, I preferably proceed as follows: The precipitate is first dried and a small quantity of graphite is added thereto. This substance is then moistened and thoroughly mixed until all the particles of the green cupric, magnesium hydroxide combination are covered with the graphite. This result will be attained when the mixing is continued until no green or greenish tint is observable in the mixture. The mixture is then dried. This dried mixture may now be introduced into perforated metallic pockets or containers of the desired shape and packed or pressed tightly into a substantially solid mass in each of said pockets. The pockets with the mixture packed therein are now ready to be mounted as the depolarizing electrode elements in primary battery cells such as described above. The graphite is thoroughly mixed with the cupric magnesium hydroxide combination so as to render the same conductive throughout and to permit electrolytic reduction of the cupric hydroxide without too great resistance to the current when such a depolarizing electrode element is mounted in a cell.

The advantage which results from employing depolarizing electrode elements formed of my improved stable, cupric hydroxide material, in primary battery cells in place of the usual cupric oxid elements, is that the current generated by such cells is given out at a voltage of from approximately 1.1 volts down to 0.8 of a volt, as against 0.8 of a volt down to 0.5 of a volt, where depolarizing elements formed of cupric oxid are employed.

It is to be understood that the method specifically described herein is subject to various changes and modifications without departure from the spirit of the invention and the scope of the appended claims.

Having now described my invention, what I claim as new and desire to protect by Letters Patent is as follows:

1. The method which consists in chemically producing cupric hydroxide and combining the same with a hydroxide of the metal of an alkaline earth upon its production, substantially as described.

2. The method which consists in chemically precipitating cupric hydroxide in the presence of a hydroxide of the metal of an alkaline earth, substantially as described.

3. The method which consists in simultaneously chemically precipitating cupric hydroxide and a hydroxide of the metal of an alkaline earth, substantially as described.

4. The method which consists in forming a mixture of sulphate of copper and the sulphate of the metal of an alkaline earth in solution and subjecting such mixture to the action of a caustic alkali, substantially as described.

5. The method which consists in treating a mixture of copper sulphate and a sulphate of the metal of an alkaline earth in solution with a caustic alkali, drying the precipitate thus produced, and mixing such dried precipitate with graphite, substantially as described.

6. The method which consists in forming a mixture of copper sulphate and magnesium sulphate in solution and subjecting the mixture to the action of a caustic alkali, substantially as described.

This specification signed this 20th day of February, 1924.

THOS. A. EDISON.